United States Patent [19]

Simpson

[11] Patent Number: 4,472,920
[45] Date of Patent: Sep. 25, 1984

[54] METHOD OF INSULATING AND SEALING AND BUILDING

[75] Inventor: Harold G. Simpson, Oklahoma City, Okla.

[73] Assignee: Encon Products, Inc., Oklahoma City, Okla.

[21] Appl. No.: 326,144

[22] Filed: Nov. 30, 1981

Related U.S. Application Data

[63] Continuation of Ser. No. 121,920, Feb. 15, 1980, , which is a continuation-in-part of Ser. No. 93,173, Nov. 13, 1979, Pat. No. 4,329,823.

[51] Int. Cl.³ .............................................. E04B 1/00
[52] U.S. Cl. ....................................... 52/741; 52/222; 52/404
[58] Field of Search ................. 52/741, 222, 404, 406, 52/407, 410, 269, 273, 408, 508, 506, 743, 746, 90

[56] References Cited

U.S. PATENT DOCUMENTS

| | | |
|---|---|---|
| 1,874,659 | 8/1932 | Upson . |
| 2,271,575 | 2/1942 | Waterman . |
| 3,398,491 | 8/1968 | Babcock ........................... 52/741 X |
| 3,729,879 | 5/1973 | Franklin ................................ 52/173 |
| 3,835,604 | 9/1974 | Hoffmann, Jr. ........................ 52/105 |
| 4,047,345 | 9/1977 | Alderman ............................. 52/404 |
| 4,078,355 | 3/1978 | Clemensen ......................... 52/222 X |
| 4,279,112 | 7/1981 | Bertrand ............................... 52/741 |

OTHER PUBLICATIONS

Mitr Sales Brochure, 1980.
Pre Engineered Building Systems–Rigid–Roll Insulation Board, Johns-Manville, Brochure, 2/76.

*Primary Examiner*—Carl D. Friedman
*Attorney, Agent, or Firm*—Bill D. McCarthy

[57] ABSTRACT

A frameless enclosure assembly, supported by the structural assembly of a pre-engineered building having first and second support members, comprising a flexible membrane; a membrane attaching assembly attaching a first end of the facing membrane to the first support member, and attaching a second end of the facing membrane to the second support member and extending the facing membrane substantially taut therebetween; an insulation layer of compressible insulation material supported by the facing membrane; a panel member positioned substantially parallel to the insulation layer to dispose same between the panel member and underlaying structural assembly; and a panel securing assembly for securing the panel to the structural assembly and transferring load from the panel member to the structural assembly while the insulation layer substantially uniformly retains its resistance to heat transfer. The insulation material may be scored so as to provide for an abrupt transition between expanded insulation and tab portions at which the membrane attaching assembly is secured.

15 Claims, 23 Drawing Figures

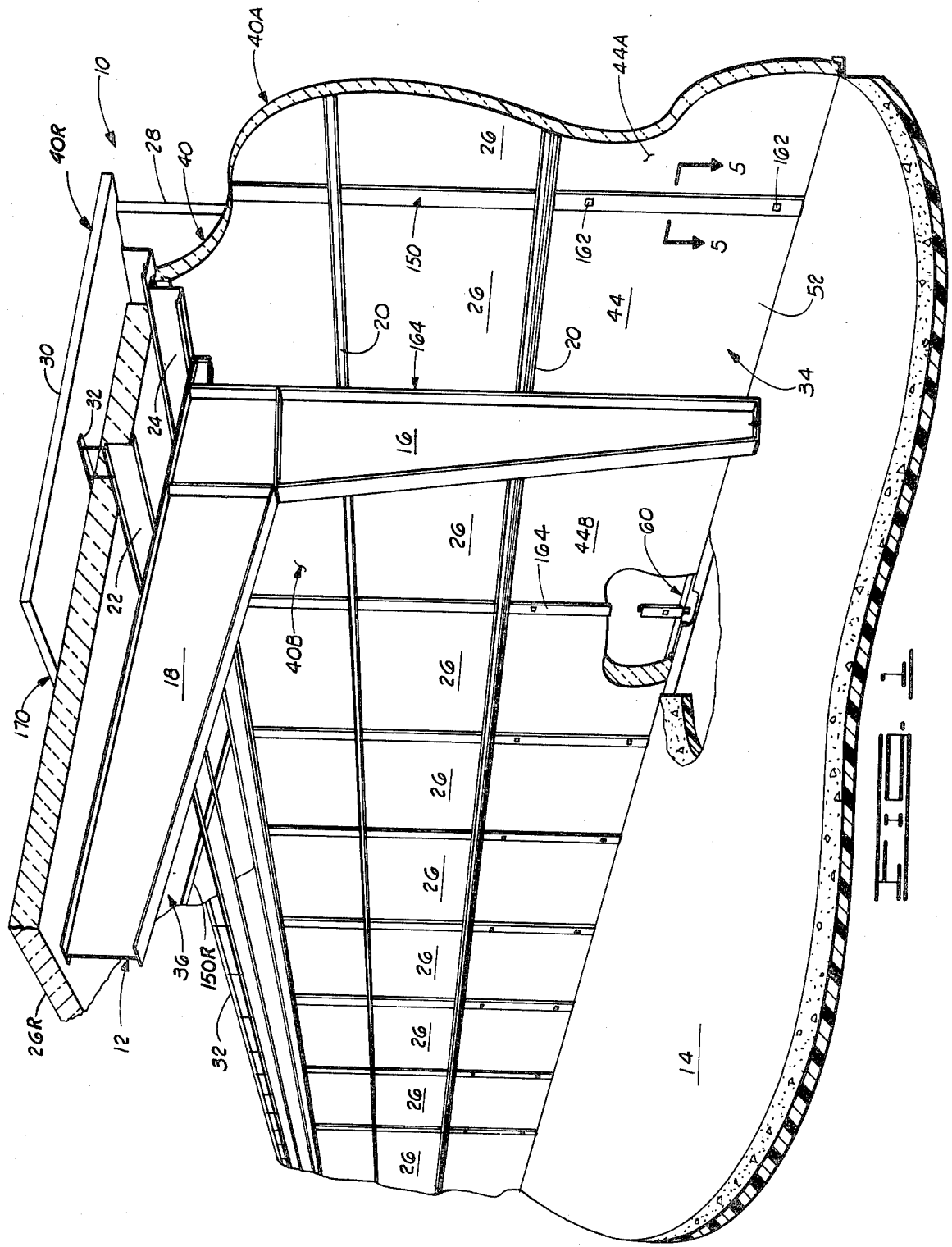

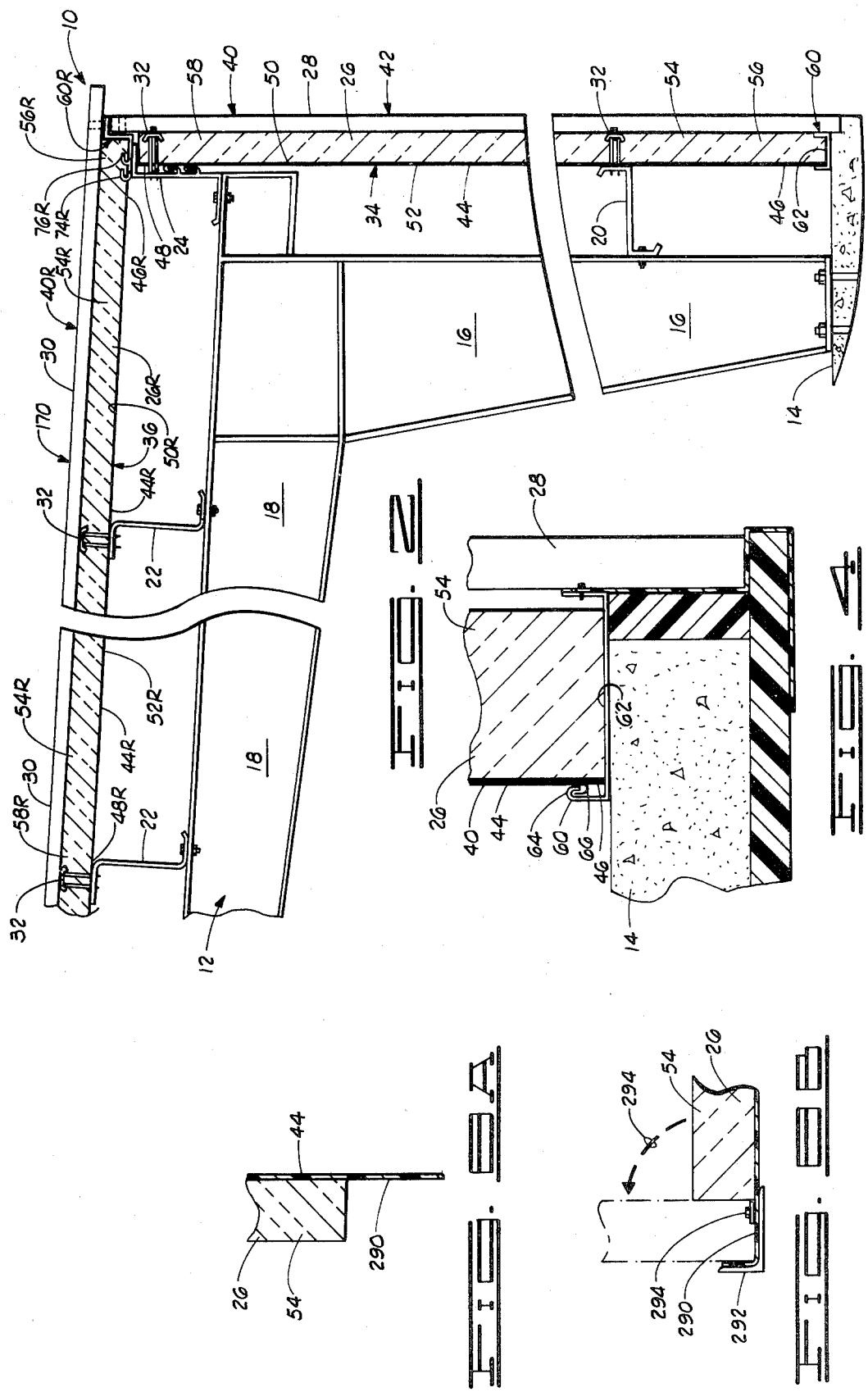

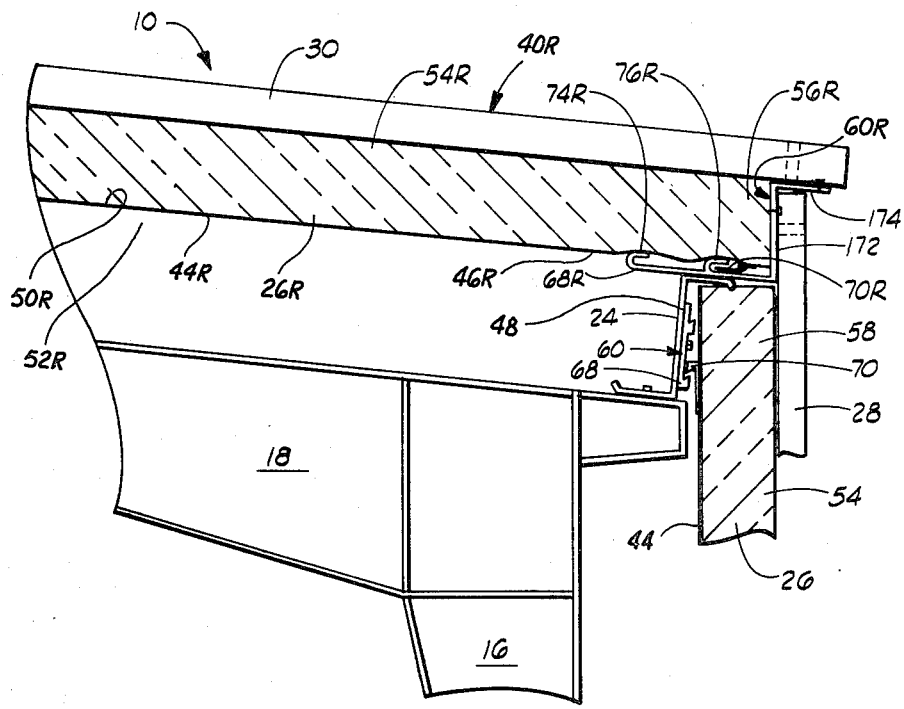
FIG. 3A
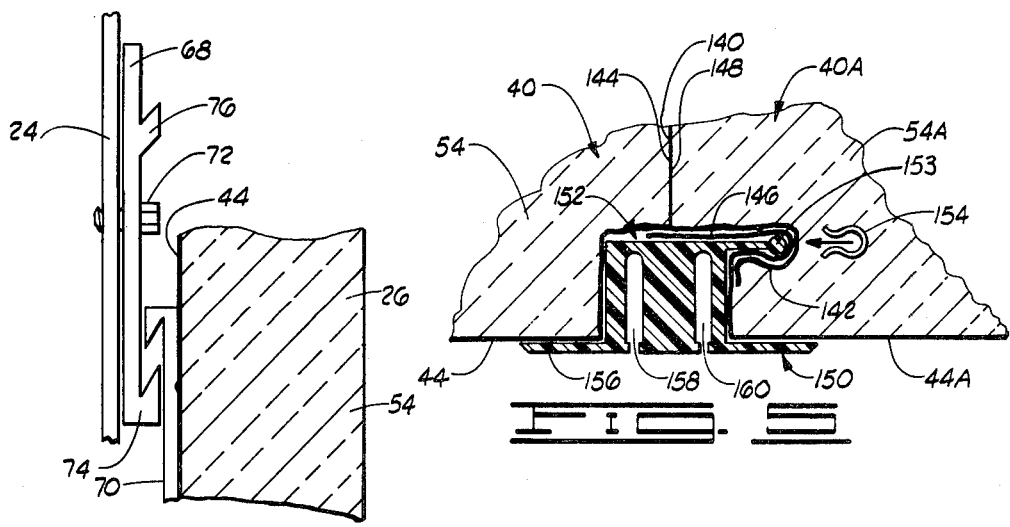
FIG. 3B
FIG. 5

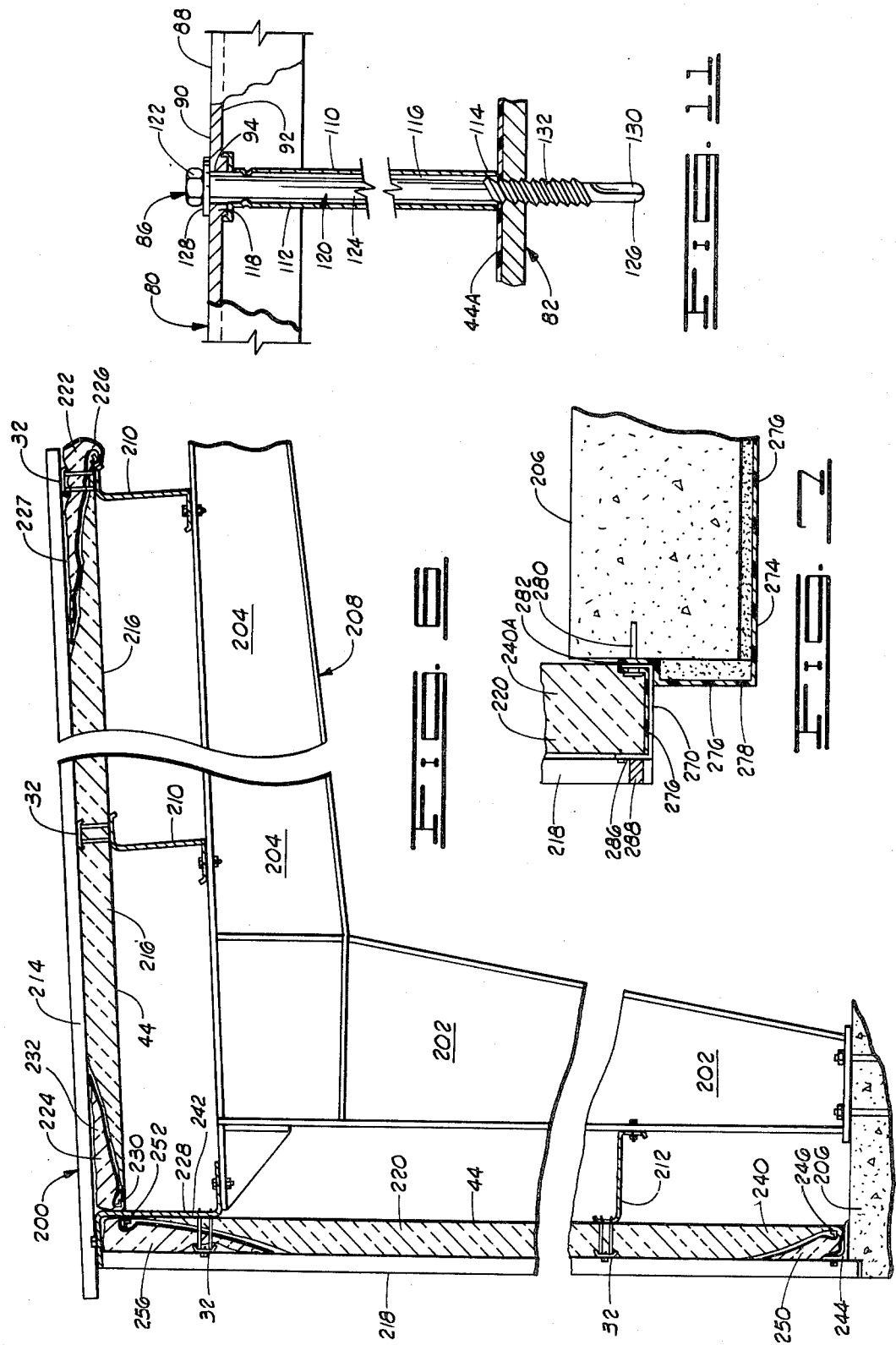

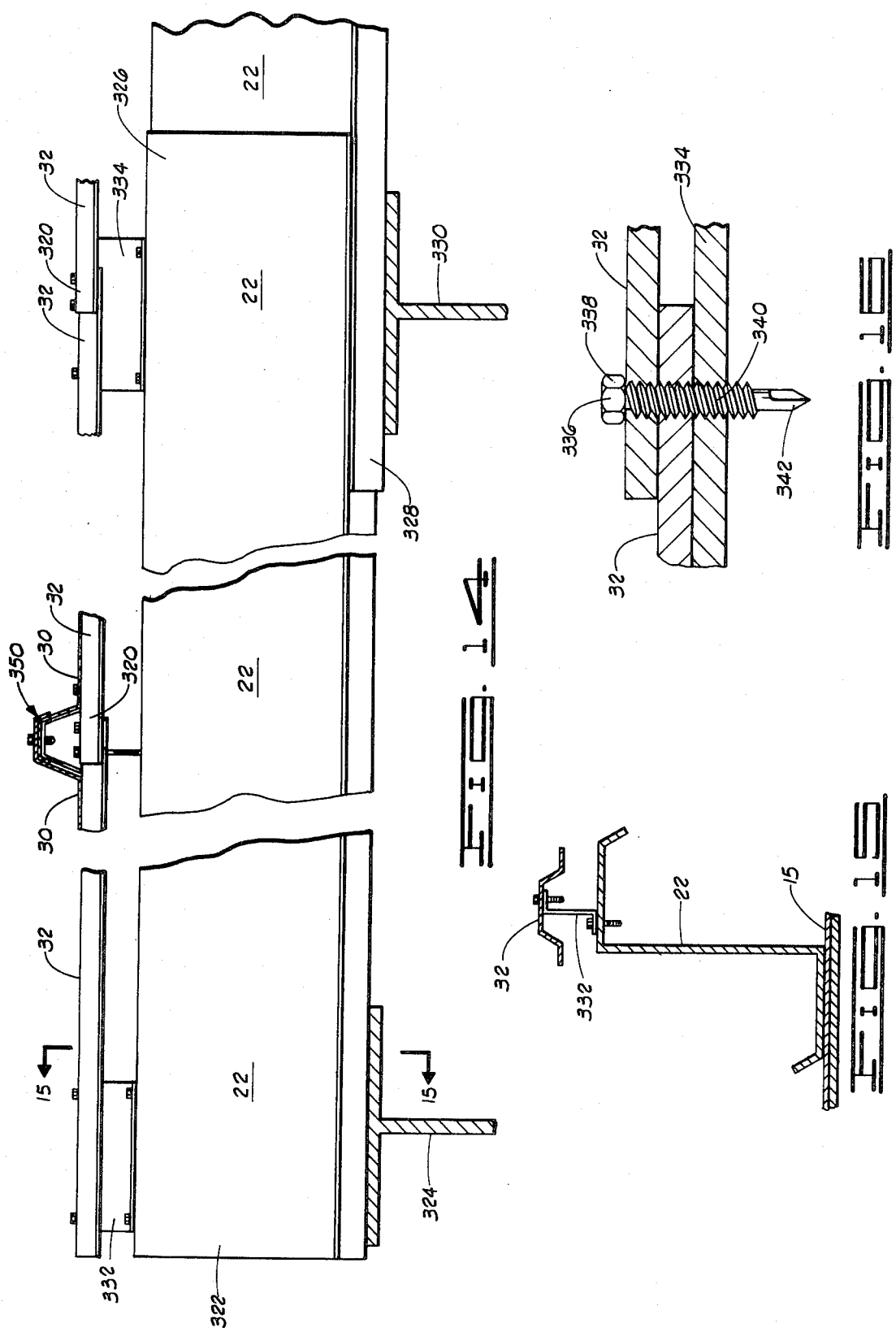

METHOD OF INSULATING AND SEALING AND BUILDING

CROSS REFERENCE TO RELATED APPLICATION

This application is a continuation, of application Ser. No. 121,920, filed Feb. 15, 1980, in turn a continuation-in-part application to a U.S. patent application entitled "Support Spacer Apparatus", Ser. No. 093,173, filed Nov. 13, 1979 and now U.S. Pat. No. 4,329,823.

BACKGROUND OF THE INVENTION

1. Field of the Invention

The present invention relates generally to the field of improving the heat transfer resistance of a paneling system in which insulation material is confined between construction members, and more particularly, but not by way of limitation, to a frameless enclosure assembly providing improved insulating qualities to pre-engineered buildings and the like.

2. Discussion of the Prior Art

The pre-engineered building industry has developed into a multi-billion dollar segment of the building construction industry in the United States, and it has experienced an increasingly greater share of the construction industry budget throughout the world. The established method of erecting the roof or wall of a pre-engineered building is to erect the primary structural members; attach the secondary structural members to the primary structural members; secure the appropriate bracing members; roll blanket-type insulation across the secondary structural members and temporarily secure the insulation in place by weights or some securing means; dispose panel members over the blanket insulation; and connect the panel members and secondary structural members together by fasteners that penetrate the blanket insulation.

Typically, attachment of roof panel members is performed by workmen who stand on top of the roof panel members and insert fasteners through the roof panel members to attach them to the underlaying secondary structural members (sometimes referred to as purlins). Similarly, the wall panel members are attached to the underlaying secondary structural members (sometimes referred to as girts) by externally positioned workmen who must insert fasteners through the wall panel members and anchor them to the girts.

The insulation of a pre-engineered building in the above described manner presents a major problem in the construction of such buildings. As the fasteners are installed through the panel members, the underlaying blanket insulation is compressed between the panel members and the underlaying secondary structural members as the fasteners are attached thereto. This compression is undesirable, as such reduces the thermal effectiveness of the blanket insulation. Furthermore, the purpose of the fasteners is to secure the panel members and to transfer load from the panel members, which is usually the exterior sheathing, to the secondary structural members. This load creates stresses that may be tension, shear or compressive stress. As to the latter, compressive stress is created by inwardly directed live loads which are transferred through the blanket insulation, which is normally a compressible but non-elastic material. As the panel members move relative to the secondary structural members during the life of the building, looseness occurs around the fasteners, and it is difficult, if not impossible, to maintain a water tight connection at the points where the fasteners penetrate the panel members.

Prior art solutions offered to this problem of compressed insulation have included the provision of elastic insulation boards that are disposed between the insulation and the panel members. These insulation boards are located such that the fasteners are caused to penetrate the boards before penetrating the insulation, and as the fasteners are anchored to the underlaying secondary structural members, the insulation boards spread the compressive load of the fasteners over a larger area of the insulation to reduce the amount of compressive reduction of the insulation thickness. While this is an improvement over the previously described method, it still has a number of shortcomings. Among these is the fact that the blanket insulation is still compressed between the insulation boards and the underlaying secondary structural members, and since the insulation boards are normally made of compressible material, the insertion of the fasteners still tends to crush the insulation boards as well. This in turn results in a number of detrimental features, which are discussed in more detail in my earlier U.S. patent application entitled "Support Spacer Apparatus", Ser. No. 093,173, filed Nov. 13, 1979.

One serious problem with the use of insulation boards in addition to the blanket insulation is the creation of void spaces between the panel members and the blanket insulation at the edges of the insulation boards as such void spaces are detrimental from a heat transfer resistance standpoint. Further, the insulation of panel members with the added insulation boards has complicated the erection of pre-engineered buildings. The natural elements, including wind, frequently dislodge the insulation boards before the overlaying panel members can be properly positioned, or the insulation boards are dislodged by the panel members as the panel members themselves are being positioned.

The pre-engineered building industry has adopted the use of "diaphragm action" to resist wind loads on a building. Diaphragm action requires that force parallel to the plane of a panel be transferred through the fastening system to the underlaying secondary structural members. While the use of insulation boards has helped somewhat in regard to increasing the thermal effectiveness of the blanket insulation, it remains that the diaphragm action on the panel members causes the load to be transferred directly through the insulation, and the problem of maintaining watertight seals around the fasteners continues even with the use of such insulation boards.

The patent issued to Taylor, U.S. Pat. No. 3,394,516, taught the use of a spacer between the panel members and the secondary structural members to prevent the panel members from being pulled so close to the secondary structural members as to crush or compress the insulation. The Taylor spacer had a plurality of pointed legs that served to penetrate the insulation, and sheet metal screws passed through the panel members and the spacers to secure the panel members to the secondary structural members. However, while the Taylor spacer substantially reduced the amount of compressive reduction of the insulation, the Taylor spacer afforded a heat conducting bridge between the secondary structural members and the panel members.

While the Taylor spacer did provide a mechanism for transferring the stress between the panel members and the supporting secondary structural members, the spacer legs of the Taylor spacer, being independent to the fasteners, could more to some degree relative to the supporting secondary structural members, thus permitting some fretting of the fasteners with the panel members. This movement can lead to a deterioration of both the watertightness of the fasteners and the thermal barrier as the insulation next to the pointed legs is spread about. Also, depending upon the type of vapor barrier provided by the insulation, penetration of the insulation by the Taylor spacer in some instances may prove difficult to effect without substantially compressing the insulation material while piercing the insulation facing, such as when a vinyl facing is provided. Finally, installation of the Taylor spacer required the placement of appropriately disposed holes in the secondary structural members for receiving the screw members which serve to secure the spacer.

There have been other problems associated with the above described prior art technique of insulating pre-engineered buildings. Clearly, it is highly desirable to create a substantially uniform, effective resistance to heat transfer in building roofs and walls, and this may be accomplished by applying a uniform thickness of insulating material over the building surface, usually referred to as the "building envelope". A uniform resistance eliminates thermal short-circuits, reducing air conditioning and heating costs.

It is clear that the use of compressible blanket insulation has in the past had some inherent disadvantages, various other materials have been pursued in an effort to provide uniform, effective resistance to heat transfer throughout the walls and roofs of buildings, including pre-engineered buildings. However, this has been difficult since a building is basically a structural element, and materials having good structural characteristics are normally poor thermal insulators. Good thermal insulators, on the other hand, normally are structurally weak. Because of this, designers have attempted to interweave materials having good structural characteristics with those which have good insulating characteristics to create a more effective building envelope. Among the various prior art solutions are structural surfacing materials such as steel or concrete with "spray-on" materials such as isocyanurate or similar foams field-applied on the inside or outside of the structural surface material. Spray-on materials have the potential advantage that they cover the building surface, regardless of its configuration, in a relatively uniform manner. While this method eliminates thermal short-circuits, the spray-on materials also have numerous shortcomings. Among these are high costs resulting from the field labor involved, poor quality control which frequently leads to inadequate bonding so that the insulation often delaminates, and project delays because of inclement weather conditions.

Another prior art solution is represented by the paneling systems which are factory or field assembled and composed of various combinations of materials. Among the paneling systems that have been tried are laminated systems composed of one or more rigid facing materials with an appropriate semi-rigid insulation attached to the rigid material for support. These systems usually have metallic facings and use foams such as urethane. A few systems have been designed which are composed of only one facing material, such as plywood, and one semi-rigid insulation, such as urethane. While these paneling systems have been generally acceptable, their cost is high and they are subject to damage during transportation and erection. In most instances, thermal short-circuits, while lessened, still exist. Examples of such panel systems may be found in U.S. Pat. Nos. 4,147,004; 4,104,840; 3,672,951; 3,667,180; 3,535,844; 3,479,784; and 3,399,503.

Other paneling systems of this type have used relatively dense batt insulation of the glass fiber type and usually rely on perimeter framing of some type to hold the insulation in place. The insulation either has to be strong enough to support its own weight without gradual crushing, or friction support must be employed. Friction from the insulation itself is often inadequate to hold the insulation in place, and as a result of vibration from wind or transportation, the insulation often becomes dislodged. The insulation itself is structurally weak and even pins or other support protrusions into or through the insulation will not serve to prevent the insulation from settling when it is used in a vertical wall. In the past, this type of paneling system has been relatively expensive and has not solved the problem of preventing thermal short-circuits through the insulation. The perimeter framing usually consists of two sides and one each top and bottom member. These type of paneling systems are sometimes referred to as sandwich panels as they normally have front and back covers, and in most instances, present thermal inefficiencies at the panel sides and ends. In an attempt to reduce these thermal inefficiencies, the prior art abounds with complex side joints which make the sandwich panel solution even more expensive. Examples of such paneling systems may be found in U.S. Pat. Nos. 4,0120,123; 4,107,892; 3,747,583; and 3,377,760.

Of all the insulation methods attempted, the use of compressible blanket insulation remains to be the least expensive and most effective means of insulating a building structure, which accounts for its wide acceptance in the building industry. Of course, blanket insulation is totally effective only if the design of the building structure provides for the use of the insulation in such a manner that the blanket insulation's full thickness is maintained, and it remains dry. Typical blanket insulation used in the building industry consists of a lightweight, highly compressible, structurally weak insulating material laminated to a lightweight, relatively high tensile impervious facing membrane that is used to place, support and maintain the insulation in a predetermined position. The combination of insulation layer and facing material is normally positioned and maintained in place by applying tensile or restraining forces to the facing material through a friction connection. In normal practice, that friction connection compresses the insulation, as discussed hereinabove, and this compression materially reduces the effectiveness of the insulation. Past attempts to use the facing membrane of the blanket insulation as a structural retainer have met with limited success, such as in U.S. Pat. No. 4,147,003. Serious thermal inefficiencies are presented by the required compression of the insulation at each side of the panel, resulting in serious thermal inefficiencies.

Among the principal reasons that past uniform thickness paneling systems have not used the relatively inexpensive, but effective faced blanket insulation in its full thickness, is that prior art attempts have not had an effective means of applying tensile or holding force to the insulation facing. In most instances, the faced blanket insulation has been clamped between the panel and the underlaying structural members. This serves the dual purpose of transferring load from the panel through the insulation to the underlaying structural system while securing the insulation in place. However, the clamping of the insulation between the panel and the underlaying structural system results in serious thermal inefficiencies. In addition, this method of clamping the facing material results in non-uniform tensile stress being created in the facing material, and this leads to wrinkles across the facing of the blanket insulation which, when the facing material is visible in the interior of the building, provide poor appearance. This non-uniform tensile stress results because the panel is normally compressed against the underlaying structural members by fasteners, and the beam strength of the panel between fasteners is insufficient to exert adequate frictional force on the insulation facing to spread the tensile load in the facing uniformly across the width of the insulation.

A commonly practiced technique is to clamp blanket insulation at the base of a wall panel, which results in compressing the insulation and reducing its thickness at its base. In most instances, the insulation is simply cut just below the bottom of the wall panel and the end of the insulation is exposed to rain, snow and other moisture. As a result, the insulation "wicks" water into the body of the insulation for a considerable distance along its length. This water further decreases the thermal efficiency of the insulation, and also results in corrosion of panel, base angle and other supporting parts. The uneven tensile stress exerted on the base of the blanket insulation also has a detrimental effect in that those areas subject to excessive stress tear and are more easily punctured, resulting in poor appearance and inadequate vapor barriers.

SUMMARY OF THE INVENTION

The present invention provides an improved insulating assembly and method in which the facing membrane of blanket type insulation is used effectively to serve as a structural retainer to keep the insulation material in place and to provide an improved vapor barrier, a membrane retaining assembly providing uniform tensile stress distribution in the facing membrane while maintaining substantially uniform thickness of the insulation material throughout its length.

The present invention provides a frameless enclosure assembly for enclosing and insulating a building structure and comprises a flexible facing membrane, a membrane attaching assembly attaching a first end of the facing membrane to a first support portion of the building's structural assembly and attaching a second end of the facing membrane to a second support portion of the structural assembly, a compressible insulation layer connected to an insulation support side of the facing membrane, a panel member positioned substantially parallel to the insulation layer to dispose the insulation layer between the panel member and portions of the underlaying structural assembly, and a panel securing assembly securing the panel to the underlaying structural assembly and extensive through the insulation layer to transfer load from the panel member to the structural assembly while the insulation layer retains a substantially uniform resistance to heat transfer.

Accordingly, an object of the present invention is to provide an improved panel assembly for enclosing and insulating a building structure.

Another object of the present invention, while achieving the above stated object, is to provide a frameless enclosure assembly for enclosing and insulating a building structure.

Yet another object of the present invention, while achieving the above stated objects, is to provide an improved panel system which utilizes the structural characteristics of a flexible membrane while maintaining substantially uniform resistance to heat transfer throughout the length of the panel system.

A further object of the present invention, while achieving the above stated objects, is to provide an improved panel system which utilizes the structural characteristics of a flexible membrane as a support for insulation material while maintaining uniform stress in the membrane and eliminating or substantially compensating for any compression of the insulation material.

Still another object of the present invention, while achieving the above stated objects, is to provide an improved panel system in which load is transferred from a panel member through a compressible insulation layer to underlaying portions of a structural assembly while minimizing the diminution of heat transfer resistance at the connections between the panel member and the structural assembly.

Another object of the present invention, while achieving the above stated objects, is to provide an improved vapor barrier in the building envelope of a structure.

Still yet another object of the present invention, while achieving the above stated objects, is to provide an improved frameless enclosure assembly and method of construction of same that will minimize the cost of enclosing and insulating a building structure while increasing the heat transfer resistance of the structure, and further, while providing ease of installation, minimizing upkeep expense and improving the appearance of the insulation envelope.

Other objects, features and advantages of the present invention will become clear from a reading of the following detailed description when read in conjunction with the drawings and appended claims.

BRIEF DESCRIPTION OF THE DRAWINGS

FIG. 1 is a semi-detailed, partial perspective view of the inside of a pre-engineered building structure depicting the use of a plurality of frameless enclosure assemblies constructed in accordance with the present invention.

FIG. 2 is a semi-detailed, cutaway end view of portions of wall and roof sections of the building structure of FIG. 1.

FIG. 3A is a semi-detailed, enlarged cutaway view of the eave strut of the building structure of FIG. 2.

FIG. 3B is yet a further enlargement depicting the insulation hooking member and retaining lip member depicted in FIG. 3A.

FIG. 4 is a semi-detailed, cutaway end view of the lower portion of a frameless enclosure assembly and a building foundation similar to that depicted in FIG. 2.

FIG. 5 is a plan view of the abutment joint taken at 5–5 in FIG. 1.

FIG. 6 is a semi-detailed, cutaway end view depiction of the construction features of a pre-engineered building structure incorporating a modification to the frameless enclosure assembly depicted in FIG. 1.

FIG. 7 is a semi-detailed, partial cutaway elevational view depicting a modification to the lower portion of the frameless enclosure assembly depicted in FIG. 4.

FIG. 8A is a depiction of the end portion of a blanket insulation roll having an end portion of the insulation layer removed from the facing membrane.

FIG. 8B depicts the attachment of the blanket insulation to a base plate member.

FIG. 11 is an elevational partial cutaway view of a column member portion of the panel securing assembly depicted in FIG. 10 as connected to a structural support member and with the insulation removed to clearly show the structure.

DESCRIPTION

Figure 9:
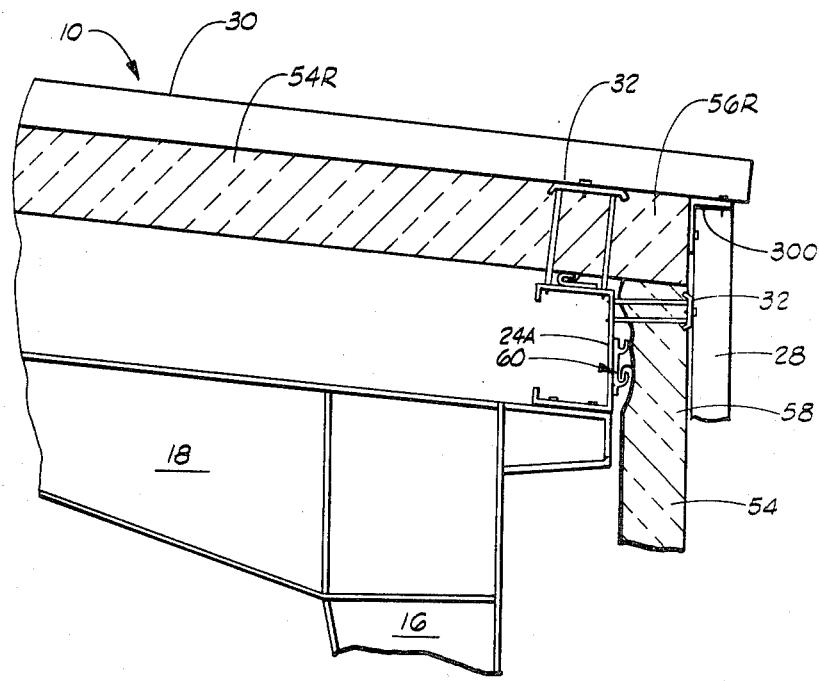
FIG. 9 is a semi-detailed, cutaway depiction of a modification to the eave strut depicted in FIG. 3A.

Referring to the drawings in general, and in particular to FIG. 1, shown therein and designated by the numeral 10 is a portion of a pre-engineered building constructed in accordance with established methods of erection and as modified by using the concepts of the present invention. The pre-engineered building 10 comprises a structural assembly 12 which includes the foundation 14, a plurality of column members 16 (only one column member is shown in FIG. 1) which are bolted to the foundation 14 and extend generally vertically therefrom, and a plurality of rafter members 18 (only a portion of one rafter member is shown in FIG. 1) which are boltingly attached to, and supported by, the upper ends of the column members 16. The structural assembly 12 also includes a plurality of secondary structural members comprised of girt members 20 and purlin members 22 that are supported respectively by the column members 16 and the rafter members 18. An eave strut or edge purlin 24 is disposed at the lower end of the rafter members 18 (or at the upper ends of the column members 16). The structural assembly 12, as described, is conventional construction detail for pre-engineered buildings, and as such is well known, further construction details need not be described herein.

My U.S. Pat. No. 4,329,823, entitled "Support Spacer Apparatus", describes the conventional method of insulating a pre-engineered building, such as the pre-engineered building 10 shown in part in FIG. 1, and it will be sufficient herein to incorporate the disclosure of that patent application by reference. As discussed therein, blanket insulation 26, sometimes hereinafter referred to as insulation batting, is positioned over the secondary structural members (the girt members 20 and the purlins 22), and a plurality of corrugated wall panel members 28 and roof panel members 30 are positioned directly adjacent to the insulation 26 and secured to the underlaying secondary structural members. Typical prior art practice was to secure the panel members 28, 30 directly to the underlaying secondary structural members 20, 22, but this caused the insulation to be compressed at the connection points, creating numerous "thermal short-circuits" through the insulation to the panel members. My U.S. Pat. No. 4,329,823 solved this problem by providing a support spacer apparatus which served to penetrate the insulation without crushing it and to which the panel members 28, 30 are secured. This feature is shown in FIG. 1 which shows a row of support spacer apparatuses 32 disposed in end-to-end relationship and connected to the purlin 22. Turning to FIG. 2, it will be noted that the support spacer apparatuses 32 also serve to connect the wall panel members 28 to the secondary girt members 20 and to the eave strut 24 in a manner which does not compress the blanket insulation 26. The support spacer apparatuses 32, which serve as insulation bridges, will be discussed more fully hereinbelow.

As pointed out above, typical prior art practice in the installation of roll blanket insulation utilized conventional clamping methods to secure the blanket insulation 26 in place. Most frequently, once temporarily positioned over the secondary structures (the girts 20 and the purlins 22, 24), the panel members 28, 30 were simply placed over the blanket insulation 26 and bolted to the underlaying structural system 12. Often, the ends of the insulation 26 would be allowed to drape outwardly from the ends of the panel members 28, 30, and even when the ends were trimmed back, these protruding ends serve to draw moisture into the body of the insulation by osmotic wicking action. Certainly, the multiple constriction points along the length of the blanket insulation resulted in a large amount of heat loss through the walls and roof even though the building had been insulated.

The present invention provides construction techniques which serve to eliminate or controllably reduce constriction of the insulation blanket 26, or in some cases, to compensate for any constriction caused during erection of the pre-engineered building 10.

As shown in FIG. 1, the pre-engineered building 10 depicts a typical case in which the blanket insulation or batting 26 serves to form the inside wall 34 and the ceiling 36 as widths of the blanket insulation are placed in edge-to-edge abutment. Such walls 34 and ceilings 36 in prior art structures were unsightly due to severe sagging caused by uneven tensile stresses created in hanging the blanket insulation, a problem the present invention also solves.

Blanket insulation, such as depicted by the insulation 26, normally comprises an insulation layer of compressible mineral or chopped glass fiber insulation (such as fiberglass) which is bonded to a flexible facing membrane. The facing membrane may consist of one or more thin layers of materials such as aluminum foil or vinyl plastic which serve a decorative purpose as well as providing a vapor membrane barrier for the building envelope. A typical blanket or batting insulation is made by CleCon Incorporated, of Cleveland, Ohio, and designated CF304 VSF, which is a product comprising a laminated facing membrane made of a layer of vinyl, a layer of fiberglass scrim, and a layer of aluminum foil. Bonded to the facing membrane is a thick layer of compressible fiberglass material.

The frameless enclosure assembly of the present invention is depicted in FIGS. 1 and 2 by the numeral 40 as forming the wall 42 of the pre-engineered building 10, and is supported by the structural assembly 12. The blanket insulation 26 comprises a membrane 44, of the type discussed above, and has a first end 46, a second end 48, an insulation support side 50 and an exposed side 52. An insulation layer 54 of compressible insulation material is supported by the insulation support side 50 of the facing membrane 44, and the insulation layer 54 has a first layer end 56 and a second layer end 58. The insulation layer 54 is attached to the facing membrane 44 and extends the length of the facing membrane 44 such that the first layer end 56 is disposed near the first end 46 of the facing membrane 44, and the second layer end 58 is disposed near the second end 48 of the facing membrane 44.

A membrane attaching assembly 60, sometimes herein referred to as an insulation attaching assembly, serves to attach and extend the facing membrane 44 substantially taut between a first support member and a second support member as follows. The first support member in FIG. 2 is the foundation 14, and the membrane attaching assembly comprises a base plate member 62 which is connected to the foundation by bolts (not shown). The attachment of the first end 46 of the facing membrane 44 to the base plate 62 can be achieved in a number of ways, as will be discussed more fully hereinbelow. One such attaching technique is depicted in FIG. 4 in which the base plate member 62 has a retaining lip portion 64 which is supported by the first support member, or the foundation 14. An insulation hooking member 66 is connected to the facing membrane 44 and is engagable with the retaining lip portion to connect the first end 46 of the facing membrane 44 to the plate member 62 so that the facing membrane 44 is uniformly gripped along its width at the first support member 14. The insulation hooking member 66 may be a solid member having a hooked shape and which is bonded to, and extensive along, the width of the facing membrane 44, or a plurality of hooking portions may be bonded to the facing membrane at predetermined spaced intervals along the width of the facing membrane such that all of the hooking portions can be brought into hooking engagement with the retaining lip portion 64 of the base plate member 62. Preferably, the dimensions and arrangements of the interlocking retaining lip portion 64 and the insulation hooking member 66 are predetermined such that the first layer end 56 can be brought into abutting relationship with the base plate member 62 in a controlled manner preventing any diminution of the thickness of the insulation layer 54. That is, the insulation hooking member 66 is disposed a predetermined distance from the end of the insulation batting 26 so that the facing membrane 44 and the first layer end 56 of the insulation layer 54 extending past the insulation hooking member 66 retains substantial rigidity such that the first layer end 56 of the insulation batting 26 can be forced against an adjacent object in a controlled manner while maintaining the thickness dimension of the insulation end 46 substantially uniform therealong.

It will be noted that the second end 48 of the facing membrane 44 is connected to the second support member, which in FIG. 2 is the eave strut or end purlin 24, in the manner more clearly shown in FIG. 3A. As shown therein, the membrane attaching assembly 60 further comprises a retaining lip member 68 attached to the second support member, or that is the end purlin 24, and an insulation hooking member 70 is connected to the second end 48 of the facing membrane 44 and is engagable with the retaining lip member 68 to connect the second end 48 of the facing membrane 44 to the second support member so that the facing membrane 44 is uniformly gripped along its width at the second support member. The retaining lip member 68 and the insulation hooking member 70 are shown in enlarged detail in FIG. 3B which shows the retaining lip member 68 attached to the end purlin 24 via a plurality of bolts 72 (only one bolt is shown). The insulation hooking member 70 may be bonded to the facing membrane 44 as discussed above for the hooking member 66. Preferably, the retaining lip member 68 has a first lip portion 74 and a second lip portion 76 which are selectively engagable with the insulation hooking member 70; the provision of a plurality of interlocking members such as the first and second lip portions 74, 76 of the retaining lip member 68 provides a selection of such members to engage the insulation hooking member 70 so that the tension in the facing membrane 44 can be selectively adjusted. That is, since the tolerances on dimensions in the erection of pre-engineered buildings causes some variableness in the dimension between any selected first and second support members (such as the foundation 14 and the end purlin 24) at any given position along the building 10, it is well to have the capability of adjusting the tautness or tension in the facing membrane 44 by selecting one of a plurality of lip portions to which the insulation hooking member 70 can be engaged. Of course, it will be recognized that only one of the retaining lip member 68 and the insulation hooking member 70 need be provided with plural interlocking members in order to provide the capability of adjusting the tautness or tension in the facing membrane 44. As was discussed for the insulation hooking member 66, the retaining lip member 68 and the insulation hooking member 70 should extend substantially the width of the facing membrane 44 so as to provide uniform gripping of the facing membrane 44 along the second support member 24.

The extension of the facing membrane 44 between the first support member (the foundation 14) and the second support member (the end purlin 24), since the insulation layer 54 is bonded to the facing membrane 44, serves to extend the insulation layer 54 in the same manner. Next, a panel member is to be positioned substantially parallel to the insulation layer 54 so that the insulation layer 54 is disposed between the panel member 28 and the underlaying structural member 12 which is comprised of the girts 20 and the end purlin 24. A plurality of panel securing assemblies are provided for securing the panel 28 to the underlaying structural assembly 12, the requirement of which being that the panel securing assemblies extend through the insulation layer 54 in such a manner that the panel securing assemblies transfer load imposed upon the panel member 28 to the secondary structural assembly 12 without substantially disturbing the insulation layer 54. That is, load imposed on the external panel members 28, such as wind load, is transferred to the structural assembly 12 via the panel securing assemblies in the form of tension, sheer or compressive stress imparted therein, and although the load is transferred through the insulation layer 54, this must be performed while maintaining the original insulation quality of the insulation layer 54. In other words, while the structural assembly 12 is receiving stress from the transference of load via the panel securing assemblies, the insulation layer 54 will substantially uniformly retain its resistance to heat transfer.

Preferably, the panel securing assemblies that serve to connect the wall panel members 28 to the underlaying structural assembly 12 comprises a plurality of support spacer apparatuses such as is taught in my earlier mentioned U.S. Pat. No. 4,329,823. A depiction of the use of a support spacer apparatus 80 occurs in FIG. 10. Shown therein is a purlin or girt 82 which represents a portion of the structural assembly of a pre-engineered building. A layer of blanket insulation 26A is disposed over the purlin or girt 82 and comprises a flexible facing membrane 44A to which is bonded an insulation layer 54A. The insulation 26A is shown partially removed at 84 so as to show the connection of the support spacer apparatus 80 to the underlaying purlin or girt 82. Each of the support spacer apparatuses 80 is attached to the underlaying structural assembly via fastener assemblies 86 that extend through the insulation material 26A and attach to the purlin or girt 82.

The support spacer apparatus 80 comprises a channel shaped spacer member 88 having an upper first support surface 90 and a lower, oppositely disposed second support surface 92. The spacer member 88 has a plurality of fastener apertures 94 communicating through it from the first support surface 90 to the second support surface 92. One end 96 of the spacer member 88 is shaped in the form of a protruding tang 98. When a plurality of support spacer apparatuses 80 which are identically constructed to the support spacer apparatus 80 are placed in end-to-end alignment, the protruding tang 98 is shaped to be received in the channel web of the adjacent support spacer apparatus; this provides for end-to-end alignment of a plurality of support spacer apparatuses to interjoin to provide a continuously extending upper or first support surface 90 along the length of the supporting purlin or girt 82. This interjoining feature serves to provide stability of the support spacer apparatuses 80 supported by a single purlin or girt 82, and further, this interlocking feature of the support spacer apparatuses 80 serves to provide a guide means for a workman as he interlocks each support spacer apparatus 80 to those already attached to the underlaying structural assembly during insulation.

Figure 10:
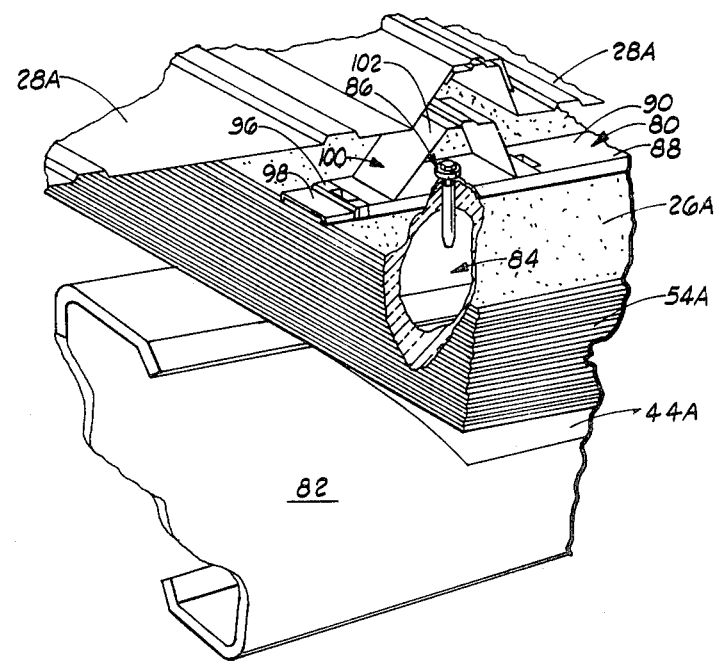
FIG. 10 is a partial cutaway perspective view of a panel securing assembly utilized to attach the panel member of the frameless enclosure assembly to the underlaying structural assembly.
Figure 17:
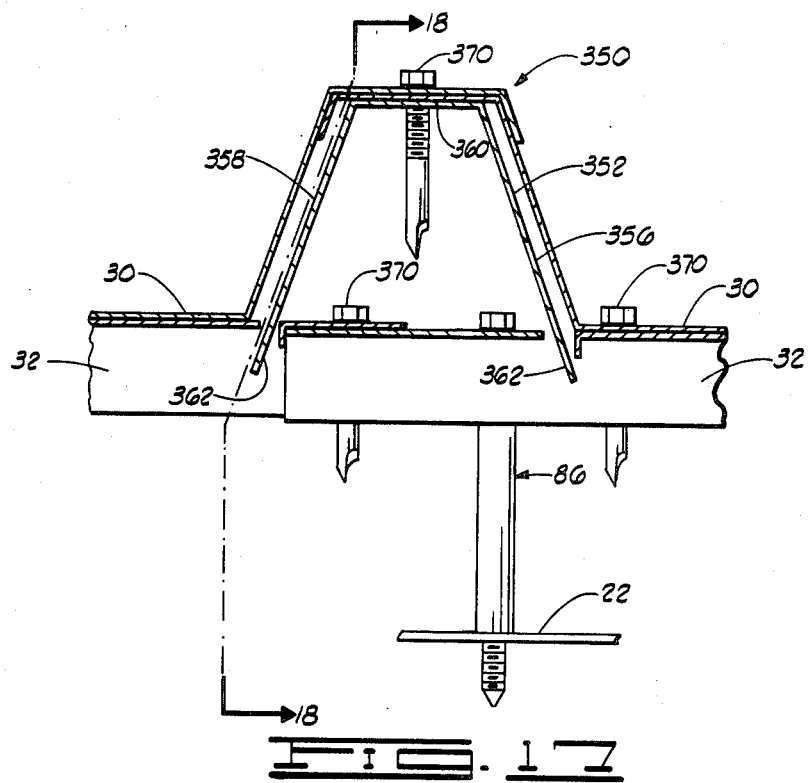
Figure 18:
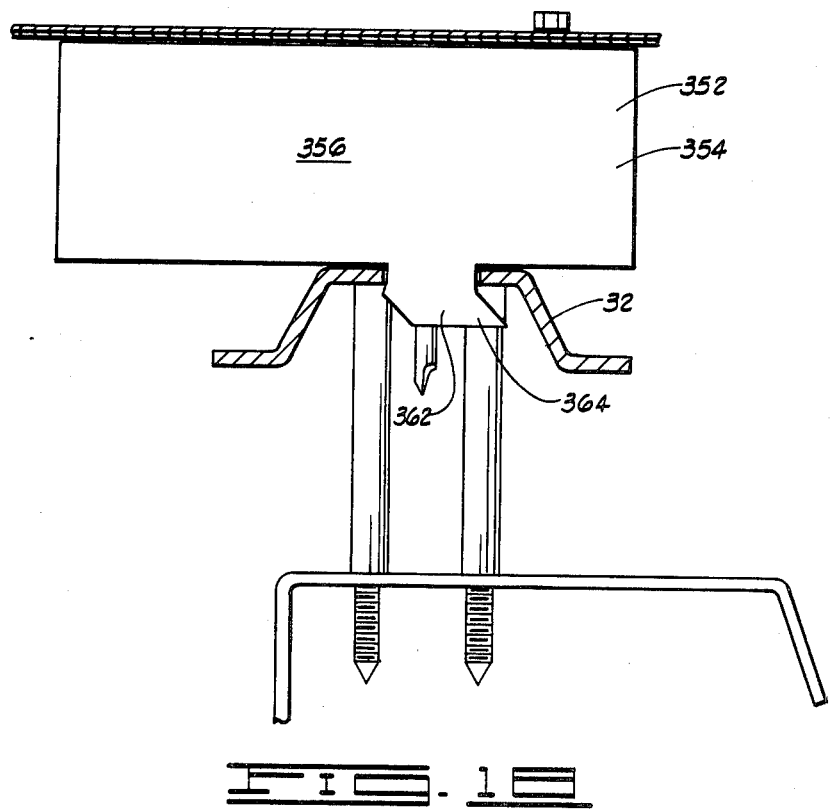

As shown in FIG. 10, a panel support bridge 100 is provided at the overlapping edges of adjacent panel members 28A. The panel support bridge 100 has a bridge portion 102 which is supported at its opposite ends on the first support, surface 90 by attachment of clip extensions disposed in appropriately disposed slots. The bridge portion 102 is configured to have a profile which will mate with the overlapping edges of the panel members 28A, and the panel members 28A are attached to the panel support bridge 100 via conventional bolts (not shown) after a sealant is disposed therebetween.

While each support spacer apparatus 80 has a plurality of fastener assemblies 86 which are designed to penetrate the insulation material 26A, only one of the fastener assemblies 86 is shown in FIG. 10, and is shown in more detail in FIG. 11 which is an enlarged, partial cutaway detailed depiction of the spacer member 88 attached to the purlin or girt 82. The fastener assembly 86 depicted in FIG. 11 comprises a column member 110 having a first end 112 and a second end 114, the column member 110 also having a bore or channel way 116 extending from the first end 112 to the distal second end 114. The fastener aperture 94 is tubulated such that the internal surface of the fastener aperture 94 is flared away from the first support surface 90 to provide a peripheral ridge 118 extending from the second support surface 92. The first end 112 of the column member 110 is flared and dimensioned to receive the ridge 118 therewithin, and the column member 110 is secured to the spacer member 88 in any convenient manner, such as by welding or by a friction fit of the ridge 118 and the flared first end 112.

The fastener assembly 86 also comprises an elongated fastener member 120 which has a first end 122, a body portion 124 and a second end 126. The first end 122 has a bolt head configuration and is optionally provided with a washer 128. The second end 126 serves as a selfdrilling/self-tapping screw and provides a drill bit end 130, the body portion 124 having a threaded portion 132 disposed in near proximity to the drill bit end 130. This design of the fastener 120 provides for the attachment of the fastener member 86 to an underlaying structural assembly at a randomly selected location by the application of rotational energy to the first end 122 to effect attachment of the second end 126 to the structural assembly.

As depicted in FIG. 11, the fastener member 120 is disposed with its body portion 124 extending through the fastener aperture 94 and the channelway 116. The second end 114 of the tube column 110 is slightly tapered so as to partially close the channelway 116 sufficiently to receive the drill bit end 130 in a friction fit therewith, permitting the distal second end 126 to partially protrude from the end of the channelway 116. This arrangement provides for tne retention of the fastener member 120 in an assembled position with the tube column 110 in a ready profile for penetration of the insulation material 26A and for securement to the purlin or girt 82.

The fastener assembly 86 is shown in FIG. 11 in its attached position, meaning that the fastener assembly 86 has been actuated to interconnect the support spacer apparatus 80 and the purlin or girt 82. That is, the fastener member 120 is shown after it has drilled a hole by forcefully rotating its first or headed end 122 with an appropriately sized wrench while the drill bit end 130 is engaged with the flange of the purlin or girt 82. Once the drill bit end 130 has drilled through the flange of the purlin 82, the continued rotation of the first end 122 causes the threaded portion 132 to engage the newly drilled hole, and further rotation of the fastener member 120 is performed until the distal, second end 114 of the column member 110 is brought into contact with the flange of the purlin 82. At this point, the first or headed end 122 of the fastener member 120 and the washer 128 (if provided) has been brought into pressing engagement with the top or first support surface 90 of the support spacer apparatus 80. This result is effected by determining the dimensional proportions of the fastener assembly 86 such that the threaded portion 132 of the fastener member 120 retains threading engagement with the flange of the purlin 82 when the second end 114 of the column member 110 comes into pressing engagement with the flange. Furthermore, the dimensional proportions of the fastener assembly 86 are established such that the distance between the top surface of the purlin 82 and the second support surface 92 of the support spacer apparatus 80, once the fastener member 120 is adequately tightened to the purlin 82, is normally approximately equal to the thickness of the insulation blanket 26A. Of course, it will be recognized that the dimensional proportions of the fastener assembly 86 can be altered as required to accomplish any desired dimensional relationship to the insulation being installed. For example, there may be installations in which some constriction of the insulation is permissible or even desired, and the amount of constriction may be eliminated or controllably reduced to any desired amount.

The compressible insulation layer 54A is omitted in FIG. 11 in order to more clearly show the details of the fastener assembly 86. However, the flexible facing membrane 44A is depicted against the flange of the purlin or girt 82 to show the staking action of the second end 114 of the column member 110 as it is brought into pressing engagement with the purlin 82. This is an important contribution of the support spacer apparatus 80 as the fastener assemblies thereof serve to pin or stake the facing membrane 44A to the underlaying structural assembly for support during the life of the insulation 26A, thereby retarding the movement of the insulation from its initial disposition determined during erection.

Returning to the frameless enclosure assembly 40 shown in FIG. 2, it will be noted that the panel securing assemblies represented by the support spacer apparatuses 32 have been installed in the manner shown. The support spacer apparatuses 32 are identical in construction to the support spacer apparatus 80 described with reference to FIGS. 10 and 11, and are installed by pressing the fastener assemblies thereof through the insulation layer 54 and attaching the fastener assemblies to the underlaying structural assembly 12, which as shown in FIG. 2 would be represented by the end purlin 24 and the girts 20. Once the panel securing assemblies 32 are in position, the panel member 28 is attached to the support spacer apparatuses via conventional bolts (not shown).

Thus, the frameless enclosure assembly 40 effectively encloses and insulates a portion of the wall 42 in a manner that uses the extended and taut facing membrane 44 as a structural member which supports the compressible insulation layer 54, the membrane attaching assemblies 60 providing uniform support across the entire length and width of the facing membrane 44. Also, the thickness of the insulation layer 54 is substantially uniform throughout its length and thus the insulation material 26 has a substantially uniform resistance to heat transfer throughout. The panel securing assemblies 32 secure the panel member 28 to the underlaying structural assembly 12 without affecting the prepenetration characteristics of the insulation material 26, and while the fastener assemblies 86 do have some heat loss therethrough, such heat loss can be considered negligible. Further, the fastener assemblies 86 assist in keeping the insulation material 26 in place by pinning the facing membrane 44 to the underlaying structural assembly 12 in the manner described above.

Returning to FIG. 1, it is expected that the frameless enclosure assemblies 40 will be installed in edge-to-edge abutting relationship to each other as shown by the plurality of insulation battings 26 shown therein. An edge portion of the frameless enclosure assembly 40 is shown in FIG. 5 which is a partial cross section of the abutment joint 140 taken at 5—5 in FIG. 1. The abutment joint 140 is created with the placement of the frameless enclosure assembly 40 in edge abutment with a frameless enclosure assembly 40A which is identical in construction detail with the frameless enclosure assembly 40. The facing membrane 44 of the frameless enclosure assembly 40 has a first edge tab portion 142 which is extensive beyond the edge 144 of the insulation layer 54, and the facing membrane 44A of the abutting frameless enclosure assembly 40A has a second edge tab portion 146 which is extensive beyond the edge 148 of the insulation layer 54A. When the frameless enclosure assemblies 40 and 40A are placed in edge-to-edge abutting relationship in the manner shown in FIG. 5, the first edge tab portion 142 of the frameless enclosure assembly 40 and the second edge tab portion 146 of the frameless enclosure assembly 40A can be sealed together in a conventional manner and tucked back into the abutment joint 140, or a first edge retaining member 150 can be utilized to seal the abutting joint 140 as follows. A channelway 152 is formed in the insulation layers 54 and 54A by compressing a small amount of insulation material or by removing same along the abutment joint 140 so that the first edge retaining member can be partially received therein. The first edge retaining member 150 has a retaining edge 153 and a clip 154 that is lockingly engageable over the retaining edge 153. The first edge tab portion 142 and the second edge tab portion 146 are placed over the retaining edge 153 in the manner shown, and the clip 154 is pushed over the retaining edge 153 to secure and seal the first edge tab portion 142 and the second edge tab portion 146. Generally, the insulation material 26 is sufficiently elastic to permit an operator to extend his hand through the abutment joint 140 from the non-membrane side of the insulation layers 54 and 54A to perform this task, and the insulation material 26 will have enough resiliency to fill out in the manner depicted in FIG. 5.

The first edge retaining member 150 is in this manner disposable along the interior of the abutment joint 140 formed when the frameless enclosure assembly 40 is disposed along side the frameless enclosure assembly 40A and the insulation layers 54 and 54A thereof are brought into edge abutment, with the first edge retainer member 150 grippingly engaging the first edge tab portion 142 of the facing membrane 44 and grippingly engaging the second edge tab portion 146 of the facing membrane 44A of the frameless enclosure assembly 40A. The first edge retaining member 150 has a cover plate portion 156 which covers the abutment joint 140 as shown in FIG. 1 to provide an attractive and continuous appearance to the inside wall 34. The first edge retaining member may be provided with conduits 158 and 160 extending a portion of the length thereof so that an electrical device, such as the outlets 162, may be supported by the cover plate portion 156, the electrical outlets 162 connectable to an electrical energy source via electrical conductors (not shown) which may be extended through the conduits 158 and 160.

In like manner, a second edge retaining member 164 is disposable along an abutment joint formed when the frameless enclosure assembly 40 is disposed alongside another frameless enclosure assembly 40B (this abutment joint is not shown) such that the insulation layers 54 and 54B thereof are brought into edge abutment. The second edge retainer member 164 is constructed identically to that of the first edge retaining member 150, and serves to grippingly engage the second edge tab portion (not shown) of the facing membrane 44 of the frameless enclosure assembly 40 and for grippingly engaging the first edge tab portion (not shown) of the facing membrane 44B of the frameless enclosure assembly 40B. Also, the second edge retaining member 164 has a cover plate portion (not shown) covering the abutment joint, and it has a conduit extending a portion of the length thereof with an electrical device supported by the cover plate portion and energized by electrical conductors extending through the conduits and connected to an electrical energy source. While the second edge retaining member 164 is not viewable in FIG. 1 because of the placement of the column member 16, a plurality of identically constructed such members are shown along the wall 34, and a cutaway portion 168 of the wall 34 shows a similar edge retaining member 164 in perspective view.

While the frameless enclosure assembly 40 has been described with reference to enclosing and insulating the wall 42 of the pre-engineered building 10, the principle of construction embodied therein is also applicable to enclosing and insulating the roof 170 of the pre-engineered building 10. Depicted in FIGS. 1 through 3A is a frameless enclosure assembly 40R which is of identical construction to the frameless enclosure assembly 40, and a brief description will be sufficient in view of the detailed description provided hereinabove for the frameless enclosure assembly 40.

The frameless enclosure assembly 40R is depicted in FIGS. 1 and 2 as forming the roof 170 of the pre-engineered building 10, and is supported by the purlins 22, 24 of the structural assembly 12. The blanket insulation 26R comprises a facing membrane 44R, of the type discussed above, and has a first end 46R, a second end 48R, an insulation support side 50R and an exposed side 52R. An insulation layer 54R of compressible insulation material is supported by the insulation support side 50R of the facing membrane 44R, and the insulation layer 54R has a first layer end 56R and a second layer end 58R. The insulation layer 54R is attached to the facing membrane 44R and extends the length of the facing membrane 44R such that the first layer end 56R is disposed near the first end 46R of the facing membrane 44R, and the second layer end 58R is disposed near the second end 48R of the facing membrane 44R.

A membrane attaching assembly 60R, sometimes herein referred to as an insulation attaching assembly, serves to attach and extend the facing membrane 44R substantially taut between a first support member and a second support member as follows. The first support member is the end purlin 24, shown in FIGS. 1 through 3A, and the second support member would normally be the end purlin on the other side of the pre-engineered building 10, or the second support member might be a ridge purlin. It is believed that a description of the first support member, the end purlin or eave strut 24, will be sufficient herein since the other end purlin would be identically constructed.

The attachment of the first end 46R of the facing membrane 44R to the end purlin 24 is achieved in the same manner that the second end 48 of the facing membrane 44 of the frameless enclosure assembly 40 is connected to the end purlin 24. More specifically, this is depicted in FIG. 3A in which the membrane attaching assembly 60R comprises a retaining lip member 68R which is attached to the end purlin 24, and has a leg portion 172 which is an upwardly extending member which abuts against the first layer end 56R of the insulation layer 54R. The retaining lip member 68R also has a leg portion 174 which abuts against the upper end of the panel 28 and to which the lower end of the roof panel 30 is bolted. The retaining lip member 68R has a first lip portion 74R and a second lip portion 76R. An insulation hooking member 70R is bonded to the facing membrane 44R in the manner described above for the insulation hooking member 66 which is connected to the facing membrane 44. In like manner to that described above, the provision of a plurality of interlocking members such as the first and second lip portions 74R, 76R of the retaining lip member 68R provides a selection of such members to engage the insulation hooking member 70R so that the tension in the facing membrane 44R can be selectively adjusted. As discussed above, the tolerances on the dimensions of a pre-engineered building causes some variances in dimensions between selected first and second support members, and it is well to have the capability of adjusting the tautness or tension in the facing membrane 44R by selecting one of a plurality of lip portions to which the insulation hooking member 70R can be engaged. As before, it will be recognized that only one of the retaining lip member 68R and the insulation hooking member 70R need be provided with plural interlocking members in order to provide the capability of adjusting the tautness or tension in the facing membrane 44R. As was discussed for the insulation hooking member 66, the retaining lip member 68R and the insulation hooking member 70R should extend substantially the width of the facing membrane 44R so as to provide uniform gripping of the facing membrane 44R along the first support member 24.

The extension of the facing membrane 44R between the first support member 24 as described, and the second support member (not shown), since the insulation layer 54R is attached to the facing membrane 44R, serves to extend the insulation layer 54R in the same manner. Next, the panel member 30 is positioned substantially parallel to the insulation layer 54R so that the insulation layer 54R is disposed between the panel member 30 and the underlaying structural member 12 which is comprised of the purlins 22 and the end purlins 24. A plurality of support spacer apparatuses 32 are provided in the manner described above for securing the panel 30 to the underlaying structural assembly 12, the requirement of which being that these panel securing assemblies extend through the insulation layer 54R in such a manner that the panel securing assemblies transfer load imposed upon the panel member 30 to the secondary structural assembly 12 without substantially disturbing the insulation layer 54R. A discussion hereinabove for the transference of load from the external panel member 28 to the underlaying structural assembly 12 is also applicable to the transference of load from the panel member 30 to the structural assembly 12 and need not be repeated at this point. Further, a description of the support spacer apparatuses 32 need not be provided relative to their utilization in the frameless enclosure assembly 40R. Once the panel securing assemblies 32 are in position, the panel member 30 is attached to the support spacer apparatuses via conventional screws (not shown). Thus, the frameless enclosure assemblies 40 and 40R effectively enclose and insulate the wall 42 and the roof 170 in a manner that uses the extended and taut facing membranes 44, 44R as structural members which support the compresible insulation layers 54, 54R the membrane attaching assemblies 60, 60R providing uniform support across the entire lengths and widths of the facing membranes 44, 44R. Also, the thickness of the insulation layers 54, 54R is substantially uniform throughout their lengths, and thus the insulation material 26, 26R has substantially uniform resistance to heat transfer throughout the building envelope.

As in the case of the frameless enclosure assemblies 40, the frameless enclosure assemblies 40R will be installed in edge-to-edge abutting relationship to each other by using a plurality of insulation battings 26R. Although not shown in the drawings, an edge portion of the frameless enclosure assembly 40R is also depicted by that shown for the frameless enclosure assembly 40 in FIG. 5, and the discussion of that figure will provide an adequate description of the edge retaining members 150R (identical in construction to the first edge retaining member 150).

As mentioned above, there are various methods whereby the ends of the insulation batting 26 can be secured while insuring no compression of insulation or compensating therefor. Another method of attaching the insulation ends is illustrated in FIG. 6 which is a partially detailed, cutaway depiction of a pre-engineered building 200. The pre-engineered building 200 comprises, in part, a plurality of column members 202, a plurality of rafter members 204, and a foundation 206, all of which comprise the structural assembly 208. The primary structure members comprise the vertically extending column members 202 and the generally horizontally extending rafter members 204 which are supported by the column members 202 and which interconnect with other rafter members (not shown) which extend across to other vertically extending column members (not shown). The secondary structural members are represented by the purlins 210 and the girts 212.

Roof panel members 214 are attached to the support spacer apparatuses 32, described hereinabove and which extend through the roof insulation 216 and are attached to the top flanges of the purlins 210. In like manner, wall panel members 218 are attached to the support spacer apparatuses 32 which extend through the wall insulation 220 and attach to the flanges of the girts 212. This arrangement assures that the thickness of the roof insulation 216 and the thickness of the wall insulation 218 is not unduly constricted by the attachment of the roof panel members 214 and the wall panel members 218, respectively, to the purlins 210 and to the girts 212.

In order to insure uniform thickness of the insulation throughout its length, a modification to the end attachment procedure previously discussed hereinabove is illustrated in FIG. 6. Typically in the prior art, the ends of the insulation would simply be pinched down and permitted to extend out over the roof edges and out from the base of the wall panels. Instead of following that practice, the ends of the insulation in the pre-engineered, building 200 are treated in the following manner.

With reference to the elongated insulation batting 216, which is identical to the insulation batting 26 previously described, the ends thereof will be designated as the first end 222 and as the second end 224. The first end 222, which is illustrated at the ridge purlin (the purlin at the uppermost point of the roof slope) where it is pinched down and secured to the top flange of the ridge purlin 210 by a plurality of screw members (not shown) which anchor an angle retainer member 226 pressingly against the insulation batting 216 along the purlin 210. This arrangement leaves an insulation tail portion 227 which is reverse folded back over the body of the insulation batting 216 to fill the void created along a zone of compression when the first end 222 is constricted or pinched down to secure it to the ridge purlin 210.

At the edge of the roof, an eave strut 228 is supported by the vertical column members 202 and extends the length of the roof. The second end 224 of the roof insulation batting 216, in like manner to that of the first end 222, is constricted to the eave strut 228 via an angle retainer member 230 and screw members (not shown). Again, this constriction and attachment of the second end 224 creates an insulation tail portion 232 which is folded back over the body of the insulation batting 216 to fill the void created along the zone of compression when the second end 224 is constricted or pinched down to secure it to the eave strut 228.

The above described, novel method of securing and reverse folding of the ends of the roof insulation batting 216 serves to insure that the insulation is maintained taut between the ridge purlin 210 and the eave strut 228, which serve as support members for the ends of the insulation. (Or if the insulation is stretched over the full building width from eave strut to eave strut, the insulation will be maintained taut from eave strut to eave strut.) Furthermore, this method maintains sufficiently full thickness at all points along the roof slope, even at the reverse folded and secured first and second ends 222 and 224, since the insulation tails 228 and 232 serve to substantially fill the voids along the zones of constriction at the ends of the insulation. Thus, a sufficient insulation blanket is maintained along the length of the roof, and furthermore, the under surface presented by the facing membrane 44 of the insulation 216 maintains an attractive, even appearance within the interior of the pre-engineered building 200.

In like manner to that described for the insulation 216, the ends of the wall insulation 220 are similarly treated. The ends of the wall insulation will be referred to as the first end 240 and as the second end 242, which are disposed respectively near the base and the top of the wall panel member 218. The first end 240 of the wall insulation 220 is constricted or pinched down and secured to a base plate member 244 which is supported by the outer edge of the foundation 206 of the pre-engineered building 200. The first end 240 is secured to the base plate member 244 by an angle member 246 and a plurality of screw members (not shown) which anchor the angle retainer member 246 along the base plate member 244. It will be noted that the wall panel members 218 are also attached to the base plate member 244. An insulation tail portion 250 is created by the securement of the first end 240 to the base plate member 244, and this insulation tail portion 250 is reverse folded back over the body of the wall insulation 220 to fill the void created when the first end 240 is constricted or pinched down along a zone of compression to secure it to the base plate member 244.

In like manner, the end 242 is constricted and secured to the eave strut 228 via an angle retainer member 252 and screw members (not shown) which extend through the angle retainer member 252 and attach it to the eave strut 228. Again, this constriction and attachment of the second end 242 creates an insulation tail portion 256 which is reverse folded back over the body of the wall insulation 220 to fill the void created when the second end 242 is constricted or pinched down along a zone of compression to secure it to the strut 228. It will be noted that the insulation tail 256 is selectively sized to be able to shape the wall insulation 220 to fill the complete space at the outer portion of the eave strut 228, as well as to compensate for the constriction or pinching down of the second end 242.

As with the roof insulation batting 216, this novel method of securing and reverse folding of the ends of the wall insulation 220 serves to insure that the insulation is maintained taut between the eave strut 228 and the base plate member 244, which means that the wall insulation 220 will be maintained taut throughout its length. Furthermore, this method also maintains substantially full thickness at all points along the complete length of the wall panels 218, even at the reverse folded and secured first and second ends 240 and 242, since the insulation tails 250 and 256 serve to fill all voids at the constricted ends.

Thus, a full insulation blanket is maintained along the height of the wall panels 218, and the interior surface of the wall insulation 218 which is presented by the facing membrane 44 maintains an attractive, wrinkle free appearance within the interior of the pre-engineered building 200. This is accomplished by the frameless enclosure assembly depicted in FIG. 6 and which utilizes an insulation attaching system for attaching the insulation batting to support members so that the facing membrane thereof extends substantially taut therebetween, and which use retainer members disposed in pressing engagement against the insulation layers of the batting and compressing same along a zone of compression for attaching the insulation batting to the support members near the first and second ends thereof. Respective first and second insulation tail portions are extended past the retainer members and reverse folded over the retainer members such that the first and second insulation tail portions compensate for the compressed thickness of the insulation batting along the zones of compression at each end thereof so that the insulation batting has substantially uniform resistance to heat transfer throughout its length.

There are alternative methods of securing the ends of insulation while maintaining full thickness of the insulation throughout its length, such as is illustrated in FIG. 7 in which the first end 240A is cut square and fitted into a base channel 270 which is preferably made of a low thermal conductivity material and supported by the concrete foundation 206 of the pre-engineered building 200. Preferably the foundation 206 of the pre-engineered building 200 is laid over a slab insulator layer 274 which in turn is laid over a slab vapor barrier 276. Typically, the slab insulator 274 would be a styrofoam material and the slab vapor barrier 276 would be a sheet of vinyl material. The outer edge of the foundation 206 is preferably covered by a layer of insulation 278, which also may be styrofoam material. The base channel 270 is disposed to extend from the foundation 206 near the top of the insulation layer 278 and attached by a plurality of fasteners 280, which may comprise tubular anchors embedded at the external edge of the foundation 206 and corresponding screw members which are extensive through appropriately located apertures in the base channel 270 and which threadingly engage the tubular anchors.

The vinyl slab barrier 276 may be caused to extend along the outer surface of the insulation layer 278, between the base channel 270 and the foundation 206, and lapped back over into and lining the inside surface of the base channel 270. The slab vapor barrier 276 can be secured in this disposition by appropriate application of a conventional adhesive, and once in place, the squared first end 240A of the wall insulation 220 is secured within the base channel 270 via a conventional adhesive or by attachment means (not shown). This arrangement provides a continuous vapor barrier from the bottom of the wall insulation 220 to beneath the foundation 206. Alternatively, the slab vapor barrier 276 may be terminated along the line 282 at the base channel 270; once the squared first end 240A is secured within the base channel 270, this arrangement should also provide an adequate continuous vapor barrier.

It will be noted that the wall panel members 218 are attached to the outer flange 286 of the base channel 270 along the base of the wall panels 218, as shown in FIG. 7. In such a case, the open corrugations of the wall panel members 218 should be plugged with panel closure members 288, which may be appropriately sized foam plugs, in order to prevent upward drafts, moisture invasion and, in general, any other form of contamination entering the internal hollows formed by the corrugations of the wall panel members 218.

While the squaring of the insulation ends has been discussed only with reference to the first end 240A of the wall insulation 220, as shown in FIG. 7, it will be appreciated that this same technique can be practiced to square and secure the second end 242 of the wall insulation 220, as well as the first and second ends 222 and 224 of the roof insulation batting 216. Further, the techniques described with reference to FIGS. 6 and 7 can be used in combination with each other, or used in combination with the practices described with reference to FIGS. 1 through 5 hereinabove.

Yet another technique of squaring and attaching insulation ends is shown in FIGS. 8A and 8B wherein is shown the insulation batting 26 in which a portion of the insulation layer 54 has been removed so that the extension of the facing membrane 44 beyond the end of the insulation layer 54 forms an end tab portion 290. As shown in FIG. 8B, the end tab portion 290 can be secured to a base plate member 292 via a retaining means such as the bolts 294 while the insulation layer is disposed to place the end tab portion 290 as a lining along the base plate member 292. Once secured to the base plate 292, the insulation batting 26 can be rotated as indicated by the arrow 294 such that the end of the insulation layer 54 is brought up over the base plate member 292 to dispose the protruding end tab portion 290 as shown in a sealing position relative to the end of the insulation layer 54. This permits a ready method of overlapping the ends of the insulation batting to effectively seal the insulation from contamination such as external moisture or the like.

The above described, novel methods of securing the ends of insulation, illustrated with respect to the previously described drawings, including FIGS. 1 through 8B, serves to provide the same benefit discussed above for the frameless enclosure assembly 40 that was discussed in large detail. That is, full thickness of the insulation is maintained along the entire length of blanket insulation, improving the thermal effectiveness of insulation and presenting an attractive, even appearance of the interior surfaces presented within the pre-engineered building.

Turning now to FIG. 9, shown therein is a semi-detailed, cutaway depiction of a modification to the end purlin or eave strut that is depicted in FIG. 3A. As shown in FIG. 3A, the end purlin or eave strut 24 supports the retaining lip members 68R which extends to the edge of the roof insulation 54R to seal the end 56R thereof. While this is an effective design, it does permit a thermal short-circuit to exist at the very edge of the roof eave. In FIG. 9, an alternative eave strut 24A is provided wherein the first layer end 56R is caused to overlap the second layer end 58 in the manner shown. The wall panel 28 is caused to extend and abut with an eave sealing plate 300 to which the wall panel member 28 and the roof panel member 30 are attached by screws. The advantage of the configuration of FIG. 9 is that of improved resistance to heat transfer through the eave of the building 10.

Figure 12A:
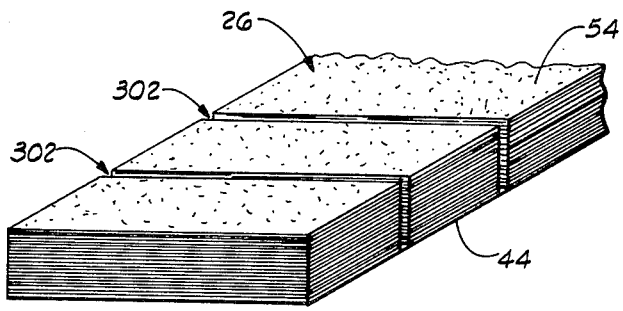
FIG. 12A is a depiction of one end of an insulation batting which has been cut along its insulation layer at predetermined intervals.
Figure 12B:
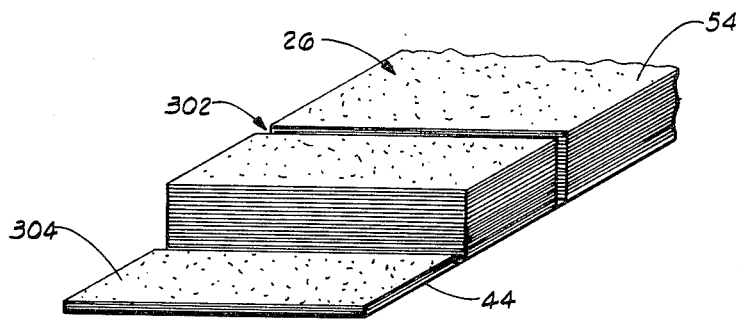
FIG. 12B depicts one of the segments of the insulation batting of FIG. 12A which has been crushed to form an end tab portion.
Figure 13A:
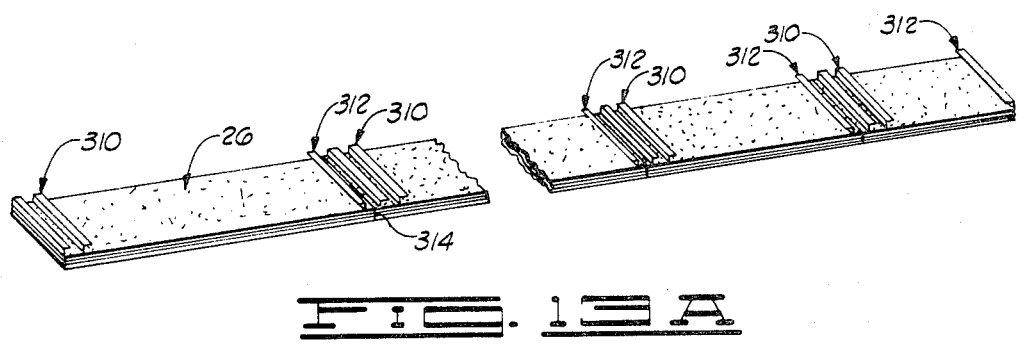
Figures 13B, 13C:
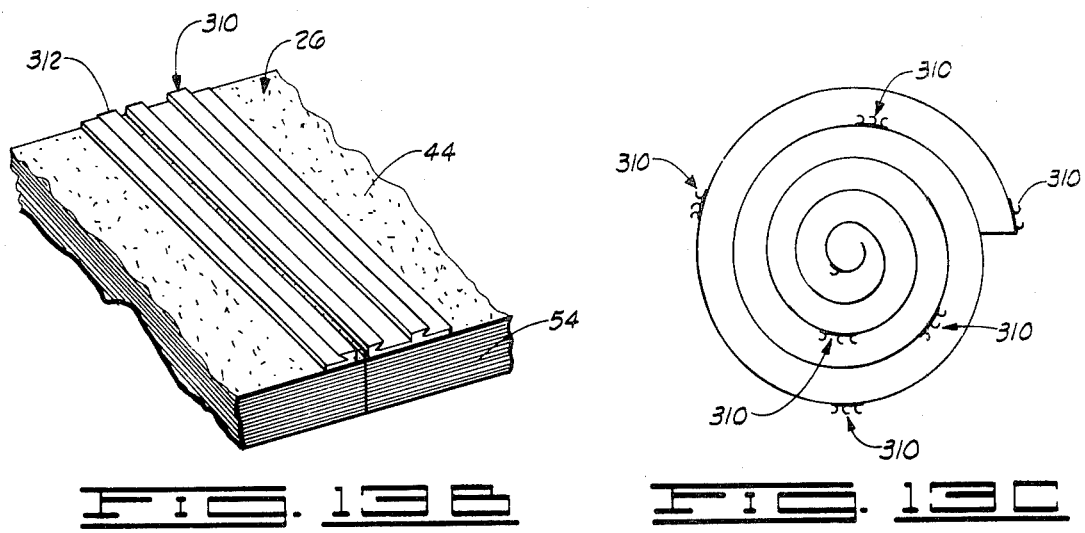

FIGS. 12A and 12B depict a novel means of providing an insulation batting 26 in which one end thereof has been slotted via the slots 302 so as to cut through the insulation layer 54 without cutting the facing membrane 44. This permits the selective tearing away or compressing of segments of the insulation material 26 to leave a protruding end tab of the facing membrane 44. For example, if the slots 302 are cut from side to side at four inch intervals from the end of the insulation layer 54, a protruding end tab portion of the facing membrane 44 of four inches long, or increments thereof, could be provided for squaring the end of the insulation and attaching the same to a base plate member such as was described in FIGS. 7 or FIGS. 8A, 8B. An alternative to tearing the insulation material away from the protruding end tab portion of the facing membrane 44 is depicted in FIG. 12B in which the segment 304 has been crushed to provide a relatively thin end tab portion consisting of the facing membrane 44 and the crushed portion of the insulation material 26. The advantage of providing precut insulation as disclosed herein is the provision for abrupt transition from the expanded state of the insulation to the crushed state on the end tab portion. This limits the zone of compression by providing segments which can be removed without affecting the thickness of adjacent sections of insulation material.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

I claim:

1. An improved method for insulating and vapor sealing a sturcture having a first support member and a second support member comprising the steps of:
   extending a flexible membrane of the type that serves to form a vapor barrier tautly between the first support member and the second support member;
   attaching the flexible membrane to the first support member by a first tab portion of the flexible membrane and to the second support member by a second tab portion of the flexible membrane; and
   securing an insulation layer of compressible insulation material to a central section of the flexible membrane.

2. The method of claim 1 wherein the flexible membrane tab portions are folded in directions from the direction of extention of the central section of the flexible membrane such that the tab portions are disposed in sealing relationship to the ends of the insulation layer.

3. An improved method for insulating a structure having first and second support members comprising the steps of:
   scoring an insulation blanket comprising a layer of compressible insulation material fixedly secured to a flexible membrane, the scoring accomplished by cutting through only the layer of insulation material a determined distance from one edge of the flexible membrane and forming a first tab portion of the flexible membrane thereby;
   scoring the insulation blanket by cutting through only the layer of insulation material a determined distance from the opposite edge of the flexible membrane and forming a second tab portion of the flexible membrane thereby;
   attaching the flexible membrane to the first support member by the first tab portion; extending the flexible membrane from the first support member to the second support member; and
   attaching the flexible membrane to the second support member by the second tab portion such that the flexible membrane extends tautly between the first and second support members and such that the layer of insulation material secured to the flexible membrane on a central section of the flexible membrane between the scoring cuts is positioned between the first and second support members.

4. The method of claim 3, wherein the layer of insulation material on the central section retains its preinstallation characteristics after completing the steps of extending and attaching the flexible membrane.

5. The method of claim 3, before the steps of attaching the flexible membrane to the first and second support members, further comprising the step of:
   folding at least one of the first and second tab portions from the direction of extension of the central section of the flexible membrane.

6. The method of claim 3 or 5, before the steps of attaching the flexible membrane to the first and second support members, further comprising:
   removing the portion of the layer of insulation material between the scoring cuts and the edges of the flexible membrane such that the first and second tab portions of the flexible membrane are substantially free of insulation material.

7. The method of claim 3 or 5, before the steps of attaching the flexible membrane to the first and second support members, further comprising:
   crushing the portion of the layer of insulation material between the scoring cuts and the edges of the flexible membrane such that the first and second tab portions of the flexible membrane have crushed layers of insulation material thereon and such that the layer of insulation material on the central portion of the flexible membrane remains uncrushed.

8. An improved method for insulating and sealing a structure with blanket insulation having a compressible insulation layer bonded to a flexible facing membrane, the structure having first and second support members, comprising:
   forming a first tab portion of the flexible facing membrane and a second tab portion of the flexible facing membrane at opposing ends of the blanket insulation, the insulation layer fixedly secured to a central portion of the facing membrane between the first and second tab portions;
   attaching the first tab portion of the flexible facing membrane to the first support member;
   extending the facing membrane between the first and second support members; and
   attaching the second tab portion of the facing membrane to the second support member such that the facing membrane extends tautly therebetween and such that the insulation layer on the central portion of the facing membrane is disposed substantially between the first and second support members and such that the insulation layer on the central portion of the facing membrane retains its preinstallation characteristics.

9. The method of claim 8 wherein the central section of the facing membrane is disposed over an underlying support member which is disposed between the first and second support members, and further comprising:

positioning at least one panel member next to the insulation layer; and attaching the panel member to the underlying support member such that the insulation layer retains its preinstallation characteristics.

10. The method of claim 8 wherein prior to attaching the first tab portion, the method further comprising:

folding the first tab portion away from the direction of extension of the central section of the facing membrane such that the first tab portion is disposed in sealing relationship to one end of the insulation layer.

11. The method of claim 10 wherein prior to attaching the second tab portion, the method further comprising:

folding the second tab portion away from the direction of extension of the central section of the facing membrane such that the second tab portion is disposed in sealing relationship to the other end of the insulation layer.

12. An improved method for insulating and sealing a structure with blanket insulation having a compressible insulation layer bonded to a flexible facing membrane, the structure having first and second support members with another support member disposed therebetween, the method comprising:

scoring the insulation layer by cutting only through the insulation layer a determined distance from one edge of the flexible membrane and forming thereby a first tab portion;

scoring the insulation layer by cutting only through the insulation layer a determined distance from the opposite edge of the flexible membrane and forming thereby a second tab portion, the insulation layer secured to a central portion of the flexible membrane;

attaching the first tab portion of the flexible membrane to the first support member;

extending the flexible membrane between the first and second support members;

attaching the second tab portion of the flexible membrane to the second support member such that the flexible membrane extends tautly therebetween and such that the insulation layer is disposed substantially between the first and second support members with the central portion of the flexible membrane disposed over the support member which is disposed between the first and second support members;

positioning at least one panel member next to the insulation layer; and attaching the panel member to the underlying support member such that the insulation layer retains its preinstallation characteristics.

13. The method of claim 12, before the steps of attaching the flexible membrane to the first and second support members, further comprising:

removing the portion of the layer of insulation material between the scoring cuts and the edges of the flexible membrane such that the first and second tab portions of the flexible membrane are substantially free of insulation material.

14. The method of claim 12, before the steps of attaching the flexible membrane to the first and second support members, further comprising:

crushing the portion of the layer of insulation material between the scoring cuts and the edges of the flexible membrane such that the first and second tab portions of the flexible membrane have crushed layers of insulation material thereon and such that the layer of insulation material on the central portion of the flexible membrane remains uncrushed.

15. The method of claim 8, 9, 10, or 11 further comprising:

installing a second flexible facing membrane in edge-to-edge abutting relationship to the first flexible membrane; and grippingly engaging respective abutting edge tab portions of the abutting first and second facing membranes such that the edge tab portions are sealed together.

* * * * *